No. 869,998. PATENTED NOV. 5, 1907.
W. S. TRASK.
MACHINE FOR MAKING BUTTS AND HINGES.
APPLICATION FILED MAY 17, 1905.

8 SHEETS—SHEET 1.

Witnesses
Chas A Beard

Inventor
WILLIAM S. TRASK
By his Attorneys

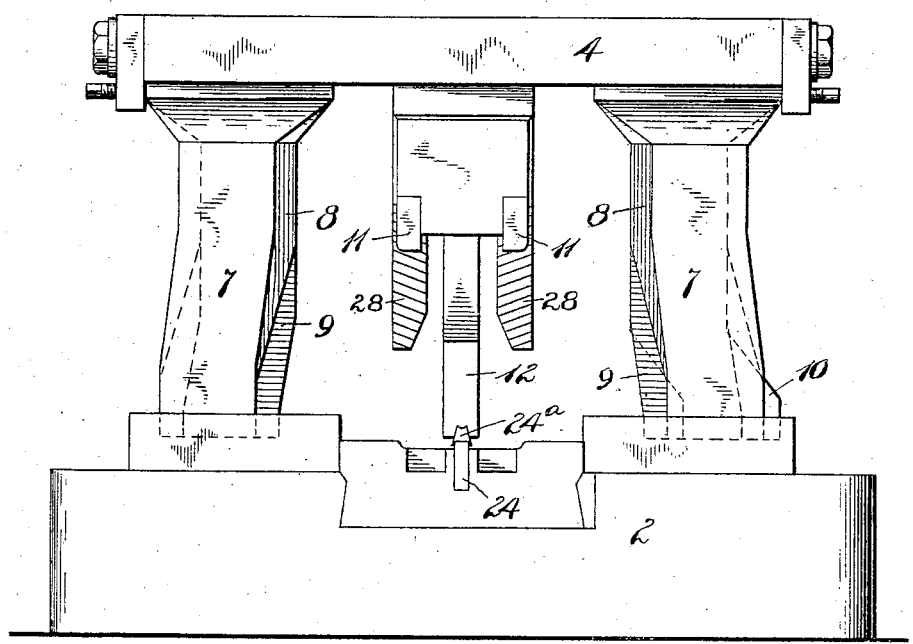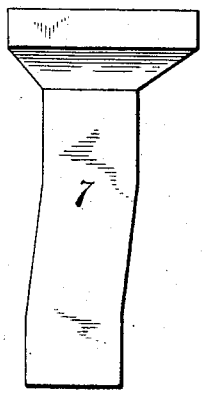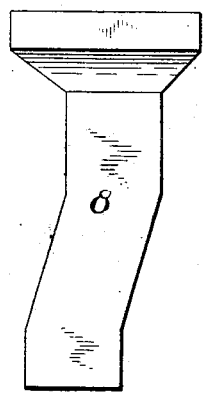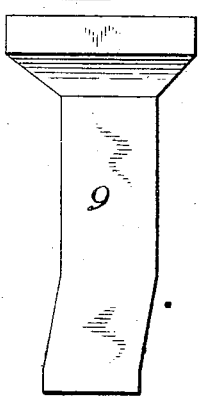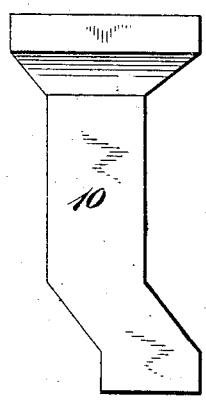

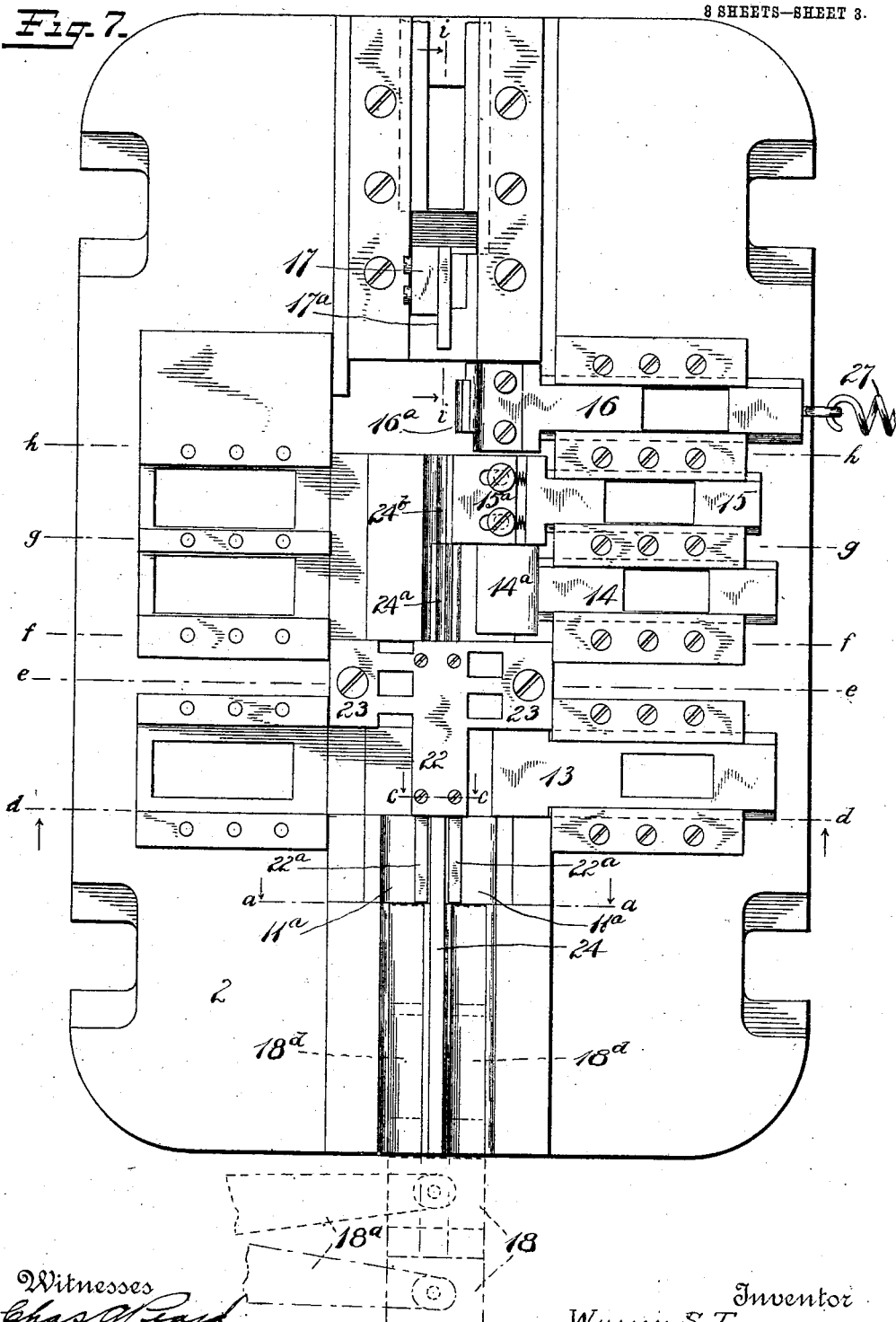

No. 869,998. PATENTED NOV. 5, 1907.
W. S. TRASK.
MACHINE FOR MAKING BUTTS AND HINGES.
APPLICATION FILED MAY 17, 1905.
8 SHEETS—SHEET 4.
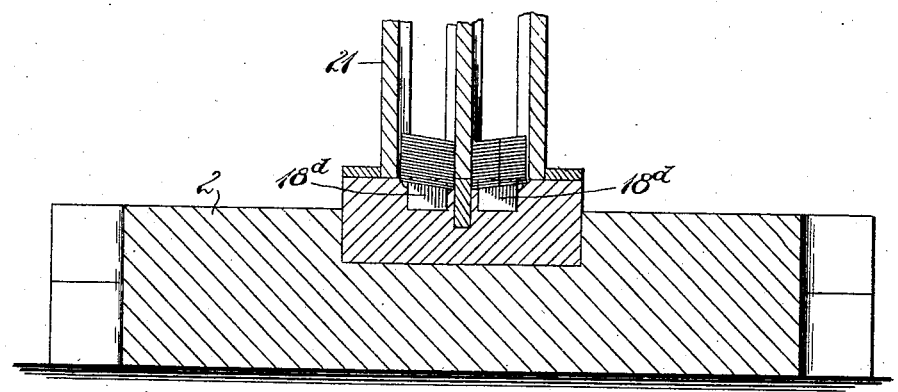
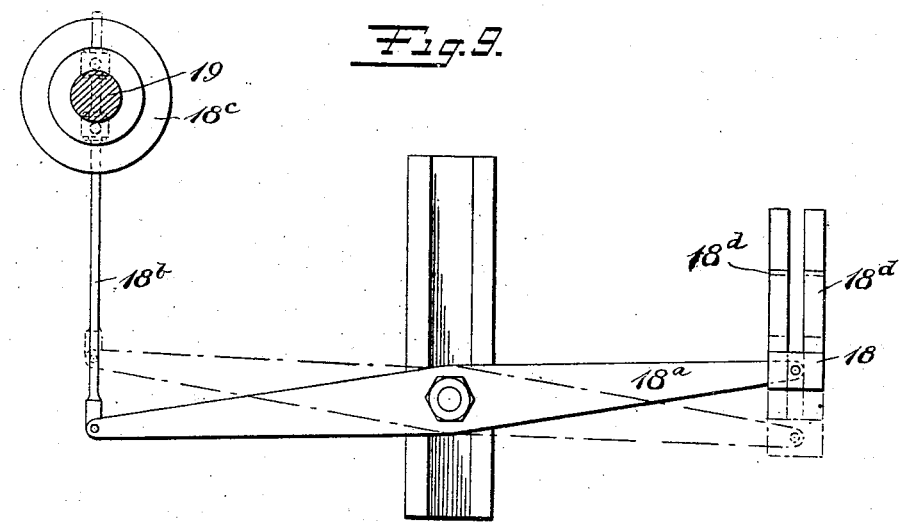
Witnesses
Inventor
WILLIAM S. TRASK
By his Attorneys No. 869,998. PATENTED NOV. 5, 1907.
W. S. TRASK.
MACHINE FOR MAKING BUTTS AND HINGES.
APPLICATION FILED MAY 17, 1905.
8 SHEETS—SHEET 5.
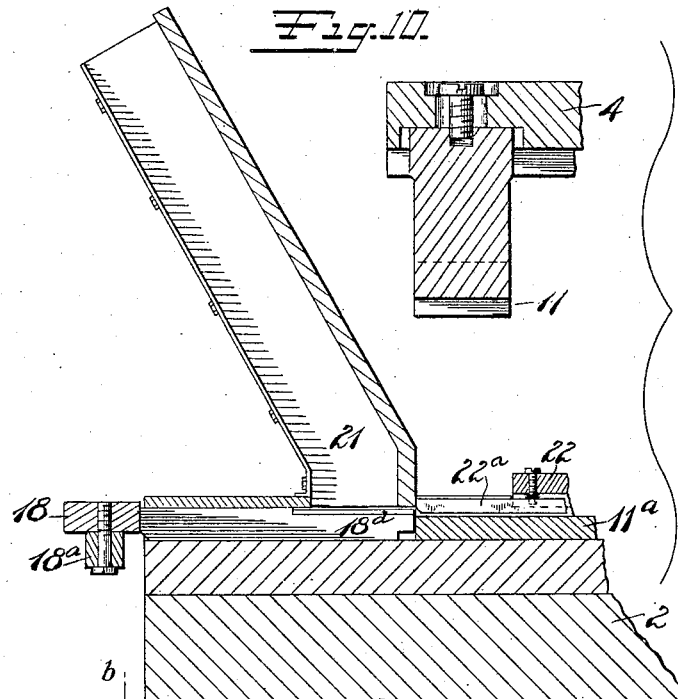
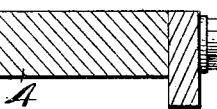
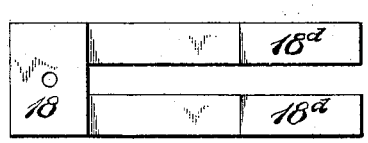
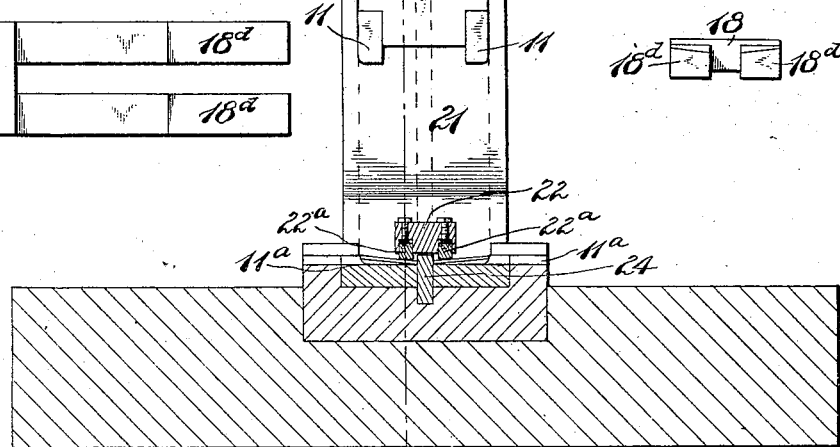

No. 869,998. PATENTED NOV. 5, 1907.
W. S. TRASK.
MACHINE FOR MAKING BUTTS AND HINGES.
APPLICATION FILED MAY 17, 1905.

8 SHEETS—SHEET 6.

Witnesses
Inventor
WILLIAM S. TRASK.
By his Attorneys

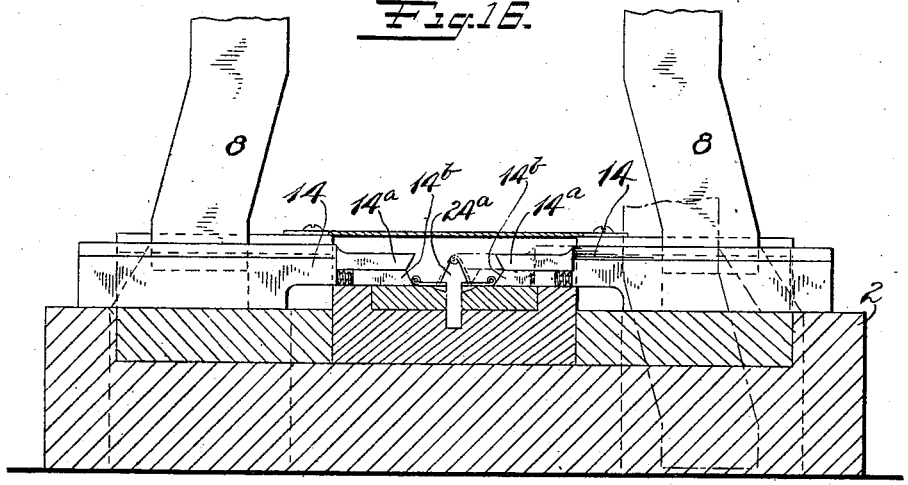
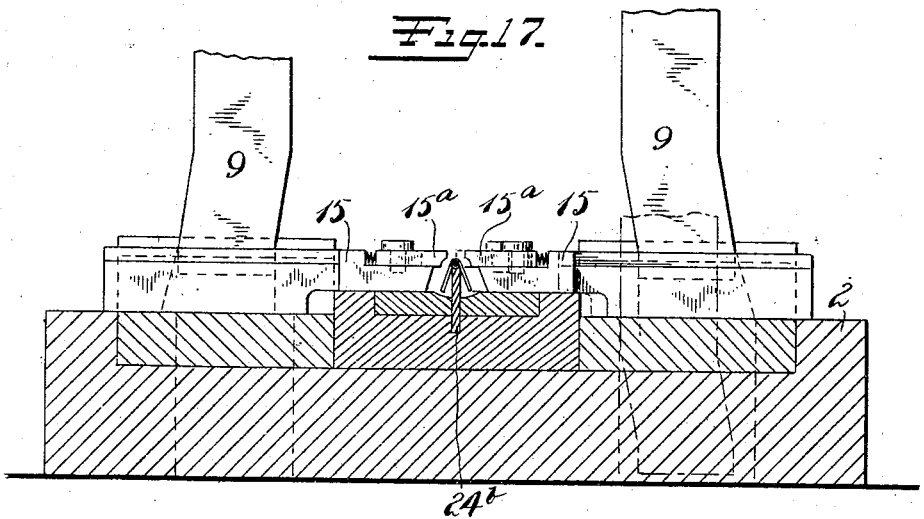

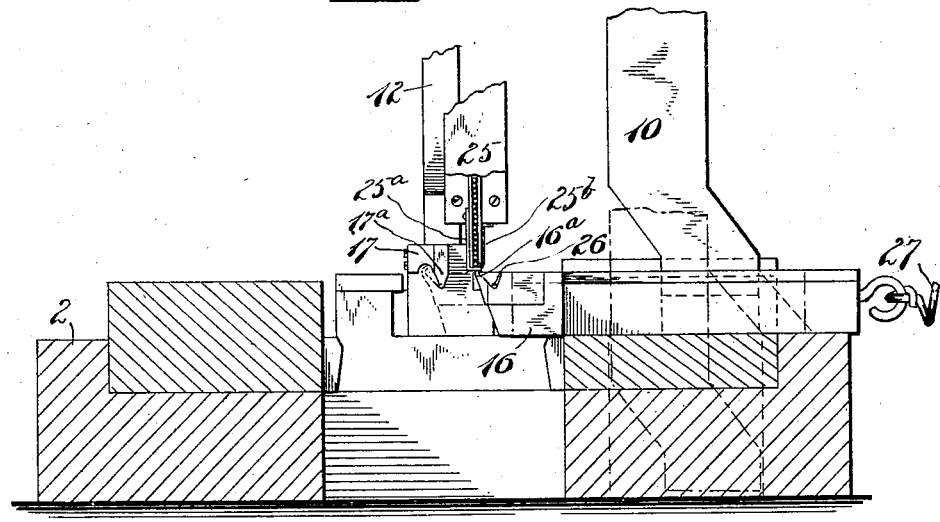
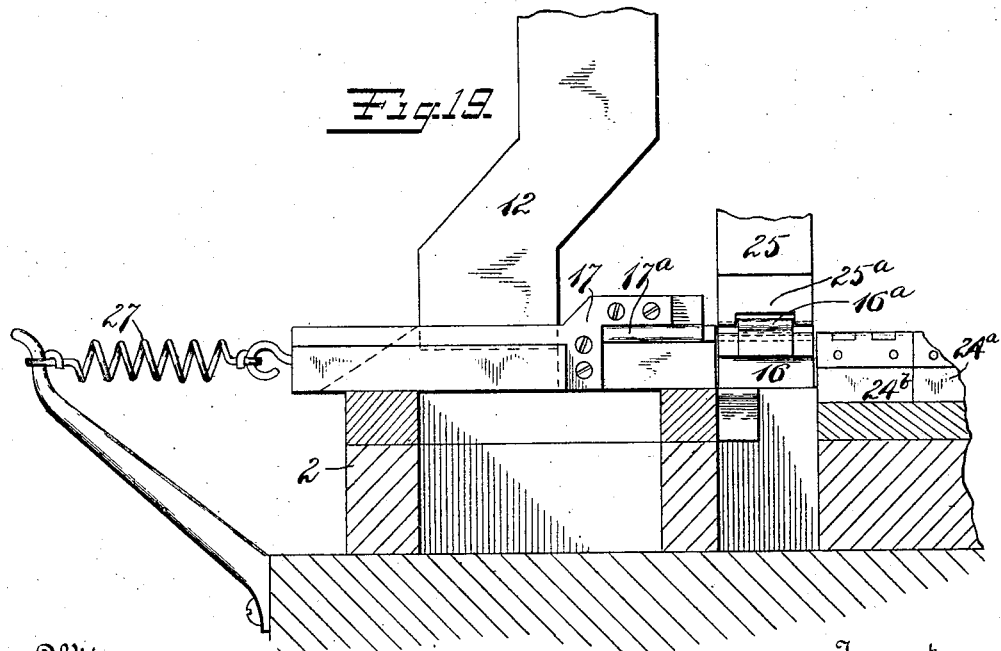

UNITED STATES PATENT OFFICE.

WILLIAM S. TRASK, OF NEW BRITAIN, CONNECTICUT, ASSIGNOR TO P. &. F. CORBIN, OF NEW BRITAIN, CONNECTICUT, A CORPORATION OF CONNECTICUT.

MACHINE FOR MAKING BUTTS AND HINGES.

No. 869,998.        Specification of Letters Patent.        Patented Nov. 5, 1907.

Application filed May 17, 1905. Serial No. 260,838.

*To all whom it may concern:*

Be it known that I, WILLIAM S. TRASK, a citizen of the United States, residing at New Britain, Hartford county, State of Connecticut, have invented certain new and useful Improvements in Machines for Making Butts and Hinges, of which the following is a full, clear, and exact description.

This invention relates to automatic machines for making butts and hinges, and consists in certain novel and useful features of construction and combinations of elements whereby suitable blanks may be successively fed into such machines and rapidly delivered in the form of completed butts or hinges.

While the apparatus is susceptible of embodiment in a variety of forms, the same is illustrated and described herein in the preferred form, no attempt being made to show modifications, since the same may be readily devised by mechanics skilled in this art.

Figure 1:
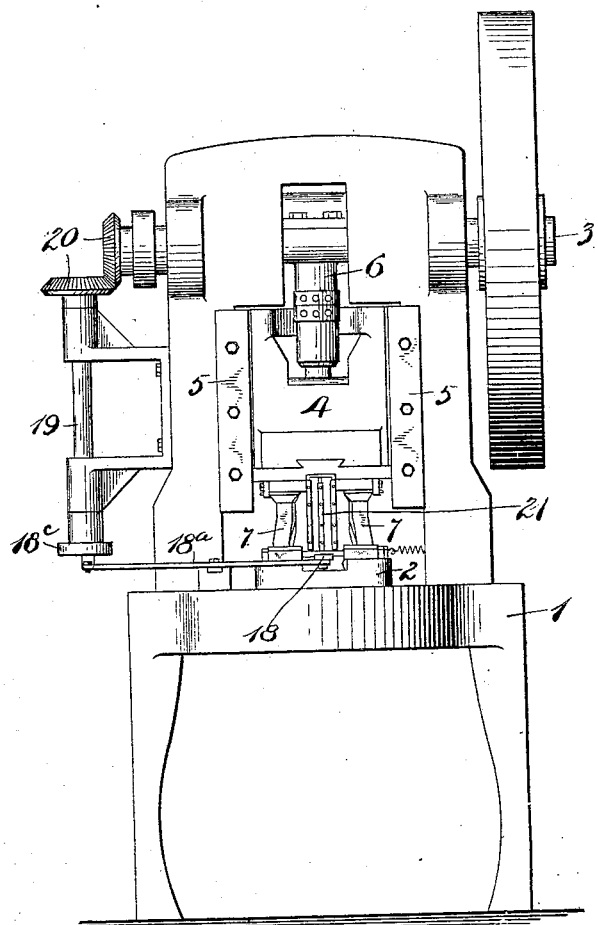
Figure 20:
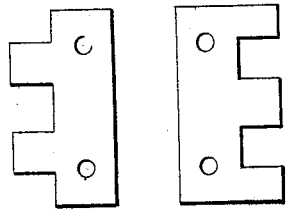
Figure 14:
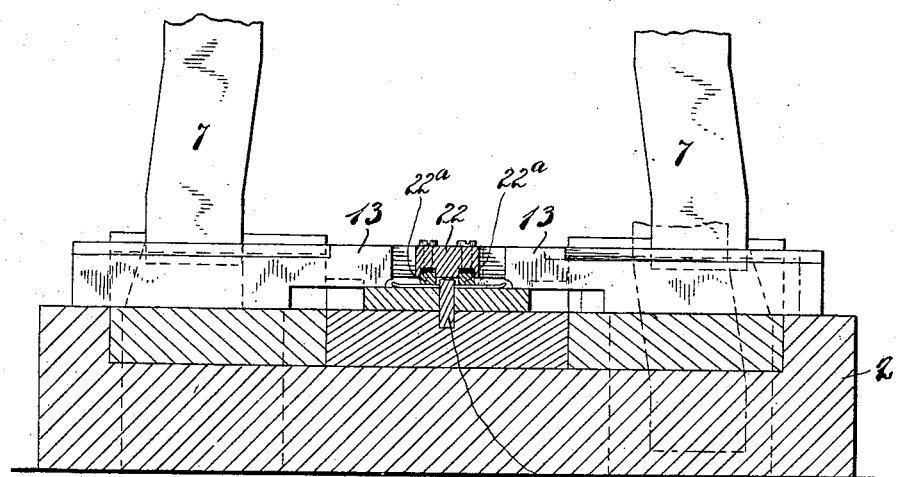
Figure 15:
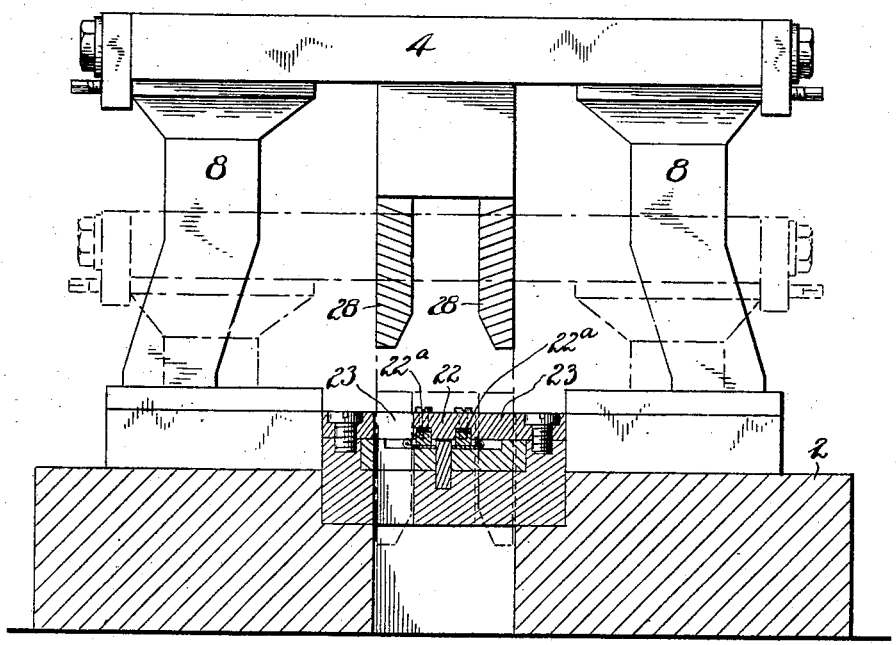

In the drawings Figure 1 is a front elevation of the entire apparatus. Fig. 2 is a relatively enlarged front elevation of details of construction. Figs. 3, 4, 5, and 6 are front elevations of certain cams, detached. Fig. 7 is a plan view of the bed, the plungers on one side being removed. Fig. 8 is a section on the plane of the line $a$—$a$ Fig. 7, looking in the direction of the arrows, a portion of the hopper being shown. Fig. 9 is a plan view of certain details, detached. Fig. 10 is a longitudinal section of the front part of the bed and adjacent parts, said section being taken on the plane of the line $b$—$b$, Fig. 11. Fig. 11 is a cross section of the bed on the plane of the line $c$—$c$ Fig. 7, looking in the direction of the arrows. Fig. 12 is a plan view of the feed plunger, detached. Fig. 13 is an end elevation thereof. Fig. 14 is a section on the plane of the line $d$—$d$ Fig. 7, looking in the direction of the arrows. Fig. 15 is an elevation partly in section, on the plane of the line $e$—$e$ Fig. 7. Fig. 16 is an elevation partly in section, on the plane of the line $f$—$f$ Fig. 7. Fig. 17 is an elevation partly in section on the plane of the line $g$—$g$ Fig. 7. Fig. 18 is an elevation partly in section on the plane of the line $h$—$h$ Fig. 7. Fig. 19 is a side elevation of certain parts, the bed being shown in section, on the plane of the line $i$—$i$ Fig. 7, looking in the direction of the arrows. Fig. 20 is a plan view of a pair of companion blanks.

1 is the frame of the press.

2 is the bed plate carried thereby and in turn carrying certain movable parts termed "plungers", which manipulate the hinge blanks in the manner hereinafter described. These plungers are operated in any suitable manner, one preferred form of operating means being hereinafter described.

3 is the main shaft driven from any suitable source of power.

4 is a vertically reciprocating head or carrier mounted in suitable guide-ways 5—5. This carrier is connected to an eccentric portion of the shaft 3 by means of a link 6. As the shaft 3 revolves, the carrier 4 ascends and descends. The head 4 carries on each side a series of cams 7, 8, 9 and 10 (see Figs. 3 to 6). At the front the said head 4 carries two shapers 11—11, while at the rear it carries another cam 12 (see Fig. 19).

In Fig. 7 I have shown on one side of the bed, a series of plungers 13—14—15—16, which manipulate the hinge blanks in the manner hereinafter described. The plungers 13 14 and 15 are duplicated on the opposite side of the bed, but are not shown in this drawing, as it is desirable to show the supporting body of the bed plate. These opposed plungers appear in Figs. 14, 16 and 17 respectively. 17 is a plunger at the rear end of the bed and is employed for driving the pin.

Now referring to Figs. 10 to 13. 18 is a plunger which feeds a pair of companion hinge blanks successively from the hopper to the bed plate and in front of the side plungers. The plunger 18 is operated in any suitable manner, for example, by means of a walking beam $18^a$ driven by a connecting rod $18^b$ from an eccentric $18^c$ mounted on a shaft 19, which latter is driven from shaft 3 by bevel gears 20—20. 21 is a hopper having two chutes arranged to receive the blanks for the hinge leaves. In Fig. 20 a plan view of two companion blanks is shown. These blanks comprise two flat pieces of metal appropriately notched at adjacent edges to furnish projections which will when completed and turned up into the proper position, constitute alternate registering knuckles, through which a pin is automatically passed to complete a hinge. A large number of these blanks may be loaded into the hopper 21, the width of the hopper being such as to obliquely support opposite blanks in the manner illustrated in Fig. 8. The bottom pair of companion blanks will be pushed into position on the bed plate by being engaged by the ends $18^d$ $18^d$ on the plunger 18. The upper surfaces of these ends are beveled to correspond with the angle of inclination of the blanks in the hopper, so that as the plunger is reciprocated only one set of blanks will be removed from the hopper at a time, the said inclines clearing and moving under the superposed blanks in said hopper. Above the bed plate is a longitudinal presser bar carrier 22, while $22^a$ $22^a$ are yielding presser bars arranged to hold the blanks down in the proper position in the run-way of said bed.

I will now describe the operation of the machine, incidentally explaining more in detail certain features of construction as the description of said operation proceeds.

The first reciprocation of the plunger 18 will push the two lowermost companion blanks into the first position on the bed (see Fig. 11) in which position they will be located directly under the shapers 11—11. In this position the blanks rest upon dies 11ᵃ—11ᵃ, are pitched at a slight incline and spaced apart by a partition 24. The presser bars 22ᵃ will now hold down said blanks. Upon the descent of the head 4, the shapers 11—11 will impinge against the blanks and crimp the outer notched edges thereof, causing them to conform to the contour of die 11ᵃ. Upon the next cycle of operation of the machine another pair of companion blanks will take the place of the first set of blanks shown in Fig. 11, and they in turn will be similarly operated upon. The forward movement of the second set of companion blanks will push the blanks first introduced into the second position, wherein they will lie between the ends of the plungers 13—13 and on each side of the partition rib 24 (see Fig. 14). The reciprocation of the plungers 13 is effected by means of the cams 7. Upon the descent of the head 4 these cams 7 will cause the plungers 13 to move ahead from the position indicated in solid lines to that indicated in dotted lines in said figure. This movement of the plungers 13—13 completes the roll in the knuckles. The introduction of the next set of companion blanks will push the first mentioned blanks into the position indicated in Fig. 15. In this position the blanks are held down from above by not only the presser bars 22ᵃ—22ᵃ, but also by overlying plate extensions 23—23. While the blanks are in this position trimmers 28—28, having file-like edges and carried by the head 4, descend and shape up the ends of the several knuckles so as to give proper clearance for the opposite knuckles which are to register therewith when the hinge leaves are brought together and assembled. The introduction of the next pair of companion blanks will push the first mentioned pair of blanks from the last mentioned position to a position in front of the ends of plungers 14 (see Fig. 16). The function of these plungers 14 is to turn the hinge leaves over and bring the knuckles together. These plungers are specially formed to that end. 14ᵃ 14ᵃ are rigid parts, while 14ᵇ 14ᵇ are yielding parts. The yielding parts are spring-pressed at the rear, so that they normally stand in the advanced position shown. These plungers are operated by the cams 8. The end of the yielding parts 14ᵇ are beveled so as to provide diverging inclines or shovel noses. The ends of the rigid parts 14ᵃ of the plungers are beveled so as to form converging inclines. When these plungers 14 advance, the then completely formed hinge leaves are first engaged and lifted by the shovel noses and then turned by the parts 14ᵃ so that the leaves will be turned and over from the position indicated in solid lines Fig. 16, to that indicated in dotted lines, the knuckles of said leaves being caused to alternately register. 24ᵃ is a support in line with the partition 24, but tapered toward its upper edge to permit the hinge leaves to be brought together. The lower edges of the hinge leaves when thus assembled, project down sufficiently far to be engaged by the next following pair of hinge leaves, so that when another pair of companion blanks is introduced, the united hinge leaves will be pushed along to the next position, in front of the plungers 15 (see Fig. 17), wherein said hinge leaves will then be supported from below by the support 24ᵇ and from the sides and above by means of the clamping jaws 15ᵃ 15ᵃ of the plungers 15, when said plungers 15—15 are advanced by means of the cams 9. When thus supported and held the hinge leaves are in proper position to receive the pin.

16 is a reciprocating plunger which performs the function of a pin selector, aliner and support (see Figs. 18—19). This plunger 16 is reciprocated by the cam 10. It has a hook-like end 16ᵃ immediately back of which is the trough for supporting a single pin.

25 is a hopper for the pins from which they are fed successively downward on to an L-shaped support 25ᵃ. The pins are held thereon by a spring clip 25ᵇ. When the plunger 16 moves from the position indicated in dotted lines to the position indicated in solid lines, the hooked end 16ᵃ engages the lowermost pin and pulls it out of line with the overlying pins, the spring clip 25ᵇ receding until said pin is freed, whereupon it slips down into the trough wherein the pin is shown at 26. When the plunger 16 advances to the position indicated in dotted lines, this pin 26 will be brought into alinement with the joined hinge leaves and directly in front of the pin driver 17ᵃ. When this occurs, the cam 12 (Fig. 19) will advance said driver and the latter will engage the end of the pin and push it directly into the passage through the knuckles of the joined hinge leaves thus completing the hinge. The plungers 16 and 17 will then recede and when the next pair of companion blanks are introduced they will push along the series of blanks one step, and the completed hinge will drop through the space formerly occupied by said plungers into a suitable receptacle.

If desired, suitable springs such as 27—27 may be attached to one or more of the plungers to facilitate the retraction of the same, thereby relieving wear on the rear side of the cams, and also relieving any tendency of the plungers to jam in their guide-ways by the lifting action of the cams, which action is accentuated in the case of cams having such a steep pitch as cams 10 and 12.

The beveled extremities of the side arms 18ᵈ of the plungers 18 are to afford a proper clearance and prevent interference between said arms and a second pair of blanks located in the hopper 21, above those to be advanced. The angle of inclination corresponds to the angle of inclination of the blanks as they appear in Figs. 8 and 11. As the blanks stand in the hopper at an angle, it is apparent that unless the ends 18ᵈ—18ᵈ of the plunger corresponded thereto, the advance of said plunger would engage more than one blank in each side of the hopper and damage would result. To avoid this, the ends 18ᵈ are beveled as described.

It will be seen that the passage along the bed plate and between the plungers constitutes a run-way for blanks, which as they progress through the same are acted upon automatically by suitable tools, transforming said plain blanks into finished hinge leaves properly united and pinned.

The apparatus is simple, efficient and durable, and by it hinges or butts are produced in a very rapid manner. Obviously, the contour of the blanks may be modified without departing from the spirit or scope of this invention.

What I claim is:

1. In a machine for manufacturing butts and hinges, a run-way divided into two parts by a longitudinal fixed partition, a longitudinally reciprocal feed plunger for feeding successive sets of companion leaf blanks along said run-way step by step, successive sets of opposed reciprocal knuckle-forming devices for progressively performing different forming operations upon opposite outer edges of a pair of companion leaf blanks while in said run-way, the central partition receiving the thrust of said devices, each set of knuckle-forming devices being located at intervals equal to the length of the blanks, means for supplying mechanically to said run-way partially formed leaves, and means for moving the said feed plunger at each stroke a distance not less than the length of each leaf blank, the knuckle-forming movement of said forming means occurring in alternation with the forward movement of said feed plunger.

2. In a machine for manufacturing butts and hinges, a bed having a longitudinal and centrally divided run-way, a longitudinally movable feed plunger adapted to operate in both divisions at one end of said run-way, a longitudinally movable pin-driving plunger operable at the opposite end of said run-way and located centrally relatively thereto but above the same, a plurality of sets of laterally movable plungers located along each side of said run-way for progressively performing different knuckle forming operations upon the opposite blanks of each set while the latter are supported in said run-way, including means for tilting a pair of finished companion blanks to cause their knuckles to register and to bring them into coöperative relation with the pin-driving plunger, a reciprocating head, and means carried by said head and coöperatively engaging the knuckle forming and tilting plungers to reciprocate the same.

3. In a machine for manufacturing butts and hinges, a run-way for blanks, means to feed blanks through said run-way, means to automatically form knuckles at the outer edges of said blanks and means to turn the blanks on their longitudinal axes and cause the knuckles of two separate blanks to register.

4. In a machine for manufacturing butts and hinges, a bed having a longitudinal run-way, a chute for conveying pairs of blanks into said run-way, a member for engaging each pair of blanks and feeding them forward in said run-way in contact with the preceding blanks, a series of laterally movable plungers arranged along each side of said run-way for performing different operations upon the blanks while in said run-way, each of said plungers having a vertical passage, a reciprocating head, and cams carried by said head adapted to operate in said plunger passages for bringing the plungers into operation.

5. In a machine for manufacturing butts and hinges, a run-way for blanks, a longitudinally movable plunger for feeding blanks through said run-way in contact with each other, a reciprocating head, means carried thereby for crimping the outer edges of blanks supported in said run-way, laterally movable plungers arranged on opposite sides of said run-way and having undercut portions to engage and curl the crimped edges, means for turning the blanks to aline the knuckles, means for inserting a pin in the alined knuckles, and cams carried by said head for operating said laterally movable plungers and pin inserting means.

6. In a machine for manufacturing butts and hinges, a run-way for blanks, a longitudinally movable plunger for feeding blanks through said run-way in contact with each other, a reciprocating head, shapers carried thereby for crimping the edges of said shanks, laterally movable plungers for curling the crimped edges into tubular knuckles, files carried by said head for trimming the ends of the knuckles, laterally movable plungers for turning the blanks and assembling them with their knuckles in alinement, means for inserting a pin, and a series of cams carried by said head for operating said laterally movable plungers and pin-inserting means.

7. In a machine for manufacturing butts and hinges, a runway for the blanks, means for feeding blanks into said runway in contact with each other and in pair, means for crimping the outer edges of a pair of blanks while supported in said runway, separate means for curling the crimped edges of said blanks into tubular knuckles while supported in said runway, means for trimming the ends of the knuckles while supported in said runway, and means for turning the blanks on their longitudinal axes to bring the knuckles into alinement while supported in said runway.

8. In a machine for manufacturing butts and hinges, a run-way for supporting blanks during all the operations of the machine, means to feed a pair of blanks simultaneously into said run-way, means to crimp the outer edges of said blanks, means to curl the crimped edges of said blanks into tubular knuckles, means to trim the ends of adjacent knuckles on one leaf to afford clearance for alternate knuckles on the opposite companion leaf, means to tilt a companion pair of finished blanks and aline their knuckles, means for feeding pins, means to select one pin, and means to insert the selected pin through said alined knuckles.

9. In a machine for manufacturing butts and hinges, a divided run-way, a presser bar above each part of said run-way, means for feeding companion blanks into said run-way and beneath said presser bars, means for forming said blanks while held by said presser bars, and means for assembling said blanks when disengaged from said presser bars.

10. In a machine for manufacturing butts and hinges, a run-way, means for feeding blanks through said run-way, means laterally of said run-way to automatically form knuckles at the edge of said blanks, and yielding presser bars above said run-way for holding said blanks down into position in said run-way during the knuckle-forming operation.

11. In a machine for manufacturing butts and hinges, a run-way, a central longitudinal partition therein, means for feeding companion blanks through said run-way on opposite sides of said partition, means for forming knuckles on the outer edges of said blanks to form hinge leaves, means for moving said leaves to bring said knuckles into alinement above said partition, and means in alinement with the assembled knuckles for automatically inserting a pin thereinto.

12. In a butt and hinge machine, a run-way, a yielding presser bar above said run-way, means for successively feeding blanks beneath said presser bar and into said run-way, and means for operating on said blank while held beneath said presser bar and in said run-way.

13. In a butt and hinge machine, a run-way, a yielding presser bar above the run-way, means for successively feeding blanks into said run-way beneath said presser bar, and means for bending the knuckle forming portions of the blanks while held by the presser bar in said run-way.

14. A machine of the character described, including a run-way having a central longitudinal fixed partition for holding the inner edges of the leaf blanks, yielding presser bars along opposite sides of said partition, opposed coöperating shaping dies along the sides of said partition in said run-way, said shaping dies having inclined outer edges, parallel reciprocating shapers coöperating with said dies from above and outside of said presser bars, and means for feeding blanks along said run-way to and from said dies.

15. A machine of the character described, including a run-way having a central longitudinal partition, opposed coöperating shaping dies along the sides of said partition and spaced therefrom and having inclined outer edges, yielding presser bars above the run-way for engaging the blanks and holding them down in said dies, and a shaper adapted to coöperate with the blanks in said dies to crimp knuckle-forming portions on the outer edges.

16. A machine of the character described, including shaping-dies having inclined outer blank supporting edges, and means forward of said dies for holding the blanks at an inclination and means for feeding blanks into said dies while at an inclination from the horizontal with their outer edges above the inner edges, a shaping plunger adapted to said shaping-dies to act upon blanks supported on said dies to crimp the outer edges of said blanks.

17. A machine of the character described, including a blank-holding hopper, and means to hold the blanks therein at an inclination, a shaping-die having an inclined shaping-portion in front of said hopper, and a coöperating reciprocating plunger in front of said die the forward end thereof being beveled so as to engage only the lowermost blank in said hopper and convey it to said die, and a vertically movable shaping-plunger coöperating with said die to crimp the edge of any blank resting on the die.

18. In a butt and hinge machine, a run-way, a presser bar above the run-way, a perforated cover plate above the presser bar, and a reciprocating trimmer operable through the perforation in said plate.

19. A machine of the character described, including a run-way having a longitudinal partition for supporting the inner edges of blanks, means for feeding blanks along said run-way, laterally sliding plungers having undercut portions adapted to engage the previously crimped outer edges of companion blanks and form knuckles.

20. A machine of the character described, including a run-way having a longitudinal partition, means for feeding blanks along said run-way, laterally sliding plungers having undercut portions adapted to engage the previously crimped outer edges of companion blanks and form knuckles, and a presser bar above said run-way for holding said blanks down while being operated upon.

21. A machine of the character described, including a stationary bed forming a support for companion blanks having knuckle portions, presser bars for holding down said blanks, and reciprocating trimmers adapted to engage the knuckles of said blanks while thus held down.

22. A machine of the character described, including an abutment for supporting the inner edges of partially formed hinge leaves, a run-way on opposite sides of said abutment, laterally moving plungers having inclined shoulders for engaging leaves having finished knuckles and turning them over on their longitudinal axes to unite the knuckles, and means for pinning a pair of finished leaves.

23. A machine of the character described, including a supporting bed, a central partition, and means for lifting the outer edges of the blanks and placing them against said partition with their knuckles interlocked.

24. A machine of the character described, including a support, a central partition acting as an abutment, and laterally moving plungers for pushing the blanks against the partitions and turning them over, said plungers having yielding portions.

25. A machine of the character described, including a bed and a central partition acting as an abutment and laterally moving plungers having inclined portions adapted to engage the edges of the blanks to push them against the partition and turn them over and bring their knuckles into alinement above said partition.

26. A machine of the character described, including a central partition forming a support, laterally operating plungers having yielding portions adapted to engage the knuckles of a pair of blanks supported on said partition, means for selecting a pin and means for inserting a pin while the knuckles are held by the plungers.

27. In a machine for manufacturing butts and hinges, means for assembling the blanks of a pair with the knuckles in alinement, a laterally movable plunger having a groove adapted to be brought into line with the knuckles, means for automatically depositing a pin in said groove, and means for engaging the pin while resting in said groove to force the pin into the knuckles.

28. In a machine for manufacturing butts and hinges, means for holding a pair of blanks with their knuckles in alinement, a pin containing hopper having a cut-away portion to hold the middle part of a single pin partially exposed, and a laterally movable plunger having a pin selecting hook arranged to make side engagement with the exposed portion of said pin, and a receiving groove below and at the side of said hook to receive a pin detached by said hook and coöperating means to move the plunger so as to bring the pin in said receiving groove into alinement with said alined knuckles, and means to drive said pin.

29. In a machine for manufacturing butts and hinges, means for holding a pair of blanks with their knuckles in alinement, a pin containing hopper, means at the bottom to support a single pin and having a cut-away portion to expose the middle part of said pin, a spring for holding said pin on said support in front of a pin selecting hook, and a laterally movable member having a pin selecting hook arranged to engage the exposed portion of said pin and remove the same.

30. A machine of the character described, including a bed having a longitudinal run-way, means for feeding blanks along said run-way, means for forming knuckles on the blanks while in said run-way, means for turning the blanks on edge in said run-way and alining the knuckles, and means for inserting a pin in the knuckles of said blanks while supported in said run-way.

31. A machine of the character described, including feeding, forming and assembling mechanisms, a bed supporting the feeding and part of the forming and the assembling mechanism, and a vertically reciprocating head carrying the remainder of the forming mechanism, and cams carried by said reciprocating head for operating the other portions of the forming mechanism and the assembling mechanism.

32. A machine of the character described, including a feed plunger, knuckle-forming plungers, assembling plungers, a pin-inserting plunger, a support for said plungers, a vertically reciprocating head and cams carried by said head for operating said knuckle forming, assembling, and pin inserting plungers.

33. A machine of the character described, including a central partition, laterally movable plungers for engaging the outer edges of companion blanks while abutting against said partition and forming knuckles, a reciprocating head and cams carried by said head operating said plungers.

34. In a machine of the character described, a support for a pair of companion hinge leaves oppositely arranged with their knuckles at their outer edges, oppositely arranged leaf turning and knuckle alining plungers, each plunger comprising a rigid upper part and a yielding shovel-nosed lower part arranged to slide under and lift the outer edge of the adjacent blank preparatory to turning the same.

WILLIAM S. TRASK.

Witnesses:
WM. V. COLLINS,
WILBUR F. GILBERT.

It is hereby certified that in Letters Patent No. 869,998, granted November 5, 1907, upon the application of William S. Trask, of New Britain, Connecticut, for an improvement in "Machines for Making Butts and Hinges," errors appear in the printed specification requiring correction, as follows: On page 3, line 66, the word "shanks" should read *blanks;* same page, line 76, the word "pair" should read *pairs,* and page 4, line 42, the word "partitions" should read *partition;* and that the said Letters Patent should be read with these corrections therein that the same may conform to the record of the case in the Patent Office.

Signed and sealed this 26th day of November, A. D., 1907.

[SEAL.]

E. B. MOORE,
*Commissioner of Patents.*